(12) United States Patent
Dong et al.

(10) Patent No.: US 11,188,145 B2
(45) Date of Patent: Nov. 30, 2021

(54) GESTURE CONTROL SYSTEMS

(71) Applicant: DTEN, Inc., San Jose, CA (US)

(72) Inventors: Jinxin Dong, San Jose, CA (US); Sally Tung, San Jose, CA (US); Jin Guo, San Jose, CA (US); Wei Liu, San Jose, CA (US)

(73) Assignee: DTEN, INC., San Jose, CA (US)

( * ) Notice: Subject to any disclaimer, the term of this patent is extended or adjusted under 35 U.S.C. 154(b) by 0 days.

(21) Appl. No.: 16/997,323

(22) Filed: Aug. 19, 2020

(65) Prior Publication Data
US 2021/0081029 A1     Mar. 18, 2021

Related U.S. Application Data

(60) Provisional application No. 62/900,232, filed on Sep. 13, 2019.

(51) Int. Cl.
    *G06F 3/01*          (2006.01)
    *H04W 4/14*      (2009.01)
    *G06K 9/00*       (2006.01)

(52) U.S. Cl.
    CPC .............. *G06F 3/011* (2013.01); *G06F 3/017* (2013.01); *G06K 9/00355* (2013.01); *G06K 9/00375* (2013.01); *G06K 9/00389* (2013.01); *H04W 4/14* (2013.01)

(58) Field of Classification Search
CPC ..... G06F 3/011; G06F 3/017; G06K 9/00389; G06K 9/00375; G06K 9/00355; H04W 4/14
See application file for complete search history.

(56) References Cited

U.S. PATENT DOCUMENTS

| | | | | |
|---|---|---|---|---|
| 9,383,895 | B1* | 7/2016 | Vinayak | G06F 3/04883 |
| 10,620,713 | B1* | 4/2020 | Ng | G06N 3/0481 |
| 2003/0076293 | A1* | 4/2003 | Mattsson | G06K 9/00335 |
| | | | | 345/156 |
| 2010/0090947 | A1* | 4/2010 | Underkoffler | G06F 3/011 |
| | | | | 345/156 |
| 2011/0169726 | A1* | 7/2011 | Holmdahl | G06K 9/00342 |
| | | | | 345/156 |
| 2011/0234840 | A1* | 9/2011 | Klefenz | G06K 9/4633 |
| | | | | 348/222.1 |
| 2013/0142417 | A1* | 6/2013 | Kutliroff | G06K 9/00355 |
| | | | | 382/159 |
| 2013/0300644 | A1* | 11/2013 | Chen | G06F 3/017 |
| | | | | 345/156 |

(Continued)

*Primary Examiner* — Nicholas Klicos
(74) *Attorney, Agent, or Firm* — Lempia Summerfield Katz LLC

(57) ABSTRACT

A computer implemented system controls an electronic device in the absence of a physical contact and/or a radio frequency communication with a user. The system detects the user's presence within a virtual detection range of a camera while the electronic device is in a standby state and transitions the electronic device to an interactive state when the user is detected. The system maintains the interactive state when a detected gesture corresponds to a predefined gesture by processing a comparison of an image of the extended finger against a plurality of images stored in a memory of the electronic device. The system renders a message as a result of the detection of the extended finger and transmits the message as a result of its movement.

18 Claims, 16 Drawing Sheets

(56) References Cited

U.S. PATENT DOCUMENTS

| | | | |
|---|---|---|---|
| 2015/0220158 A1* | 8/2015 | Elangovan | G06F 1/163 |
| | | | 345/156 |
| 2016/0026253 A1* | 1/2016 | Bradski | H04N 13/344 |
| | | | 345/8 |
| 2016/0203360 A1* | 7/2016 | Alvarez | G06F 3/04845 |
| | | | 345/156 |
| 2020/0368616 A1* | 11/2020 | Delamont | A63F 13/25 |

* cited by examiner

GESTURE CONTROL SYSTEMS

PRIORITY CLAIM

This application claims the benefit of priority from U.S. Provisional Application No. 62/900,232 filed Sep. 13, 2019, which is herein incorporated by reference.

BACKGROUND OF THE DISCLOSURE

Technical Field

This application relates to vision-based interfaces.

Related Art

Vision-based interfaces are invisible tools that are challenging to implement. Hand and limb movements are not always captured do not always express thought. Some vision-based interfaces are very complex. Unlike physical devices, some interfaces are counter-intuitive and do not provide feedback. Others are susceptible to false negatives (e.g., the recognition of random and unintended motions). Further, some vision-based interface's use of gesture-commands exclusively makes many vision-based interfaces unable to communicate with and control software applications as the gesture-commands are susceptible to confusion due cultural differences.

DETAILED DESCRIPTION

A turn-key touchless user interface and process (referred to as a touchless system/interface or system(s)) provides a natural and intuitive technology that enables all users to communicate with remote devices with little or no training. The systems enable users to control computers and other devices without requiring hand-held button-activated devices or keyboards. The systems are immediately accessible and some provide visual cues of gesture-message associations that reduce the user's mental burden to recall gestures and trajectory associations. The systems imitate the way users communicate with one another further reducing the recall needed to communicate with remote systems. Employing hand gesture recognitions and upper limb recognitions the systems enable multiple forms of natural human communication without regard to cultural backgrounds. The systems enable users of all cultural background's with or without physical abilities to communicate in a sterile no-touch environment. The assistive technologies are robust and provide access to many knowledge domains.

Figure 1:
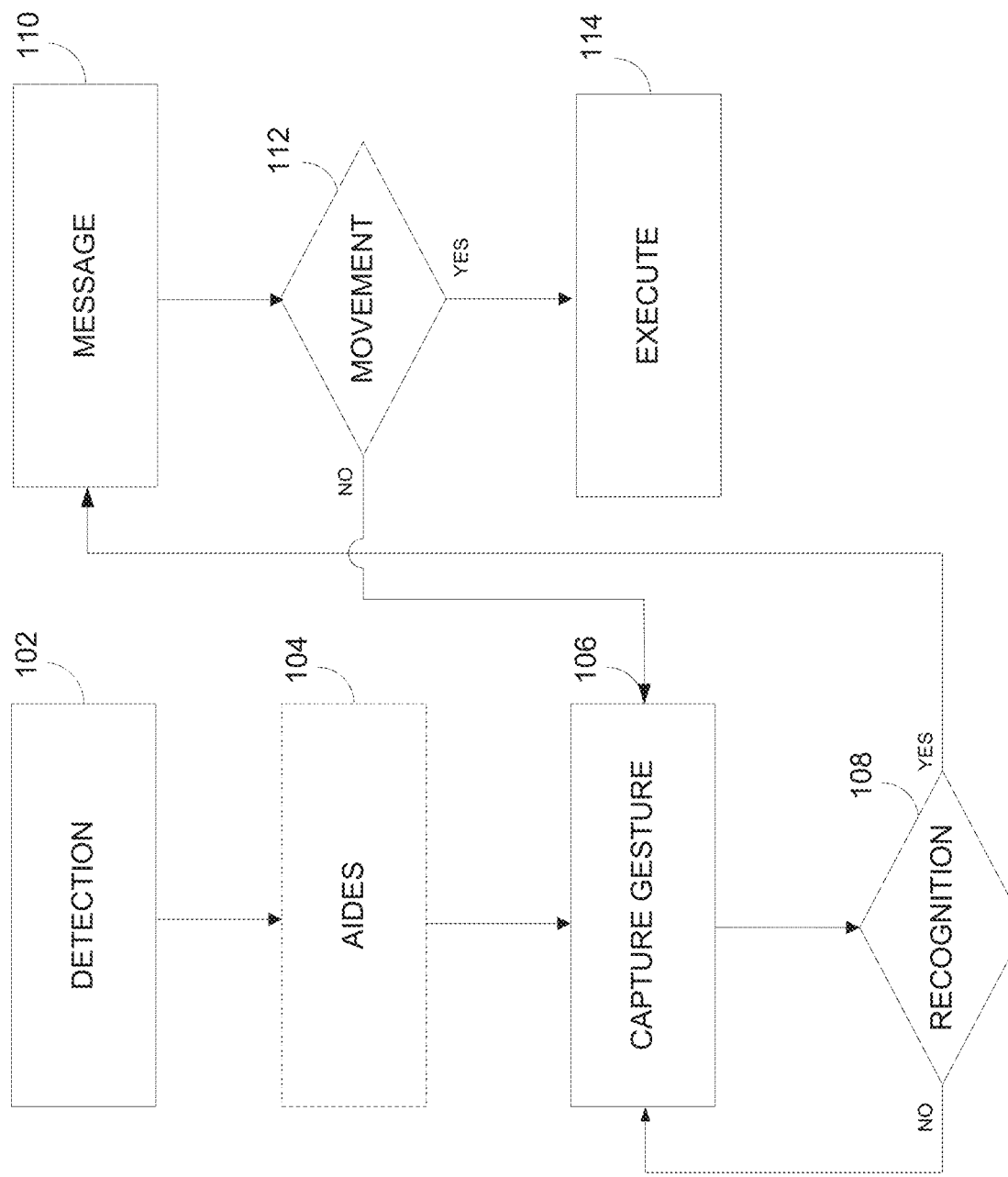
FIG. 1 is a vision-based hand and arm-gesture recognition process.

FIG. 1 is a flow diagram illustrating some of the functionality of the touchless interface that provides messaging feedback. The term message is intended broadly to encompass a unit of information transmitted electronically or optically by a computer, server, or other electronic or optical devices to a destination in response to a detection and/or a recognition event. As shown in either FIG. 1 or 14 an optional proximity or optical sensor 1634 detects the presence, and in some software applications, measures or estimates distance of one or more users (e.g., the target(s)) in a virtual interaction area without physical contact with the sensor at act 102. A passive infrared and/or motion sensor that is a unitary part of the one or more cameras 1616 in some systems and a standalone camera 1616 in others, for example, detects the presence of one or more users, when motion or a difference in temperature relative to the measured or estimated room temperature exceeds a pre-programmed threshold, respectively, occurs. The systems transition from a stand-by state (e.g., a dormant state) to an interactive state (e.g., an active state). The transition occurs in real-time (e.g., waking-up at the same rate the detection occurs, no delay) in some systems, and in near-real time in other systems. Delay is minimized in some systems by loading application software in the background. In these systems, background loading improves system responsiveness eliminating a move and wait operating state that is perceived by some users to be slow and sluggish, and thus, impractical for commercial purposes.

Some systems render optional output aides at act 104, such as visual indicators on a display 1606, for example, indicating how a user (e.g., the human user) can interact with the systems, before further interactions occur. The detection of a user's presence in a virtual interaction area triggers one or more messages or one or more visual cues that explain or suggest how a particular input or motion initiates a message and its execution, such as how a predefined gesture such as finger pointing from an occluded hand, an arm position, and/or their movements, respectively, for example render a message and/or their respective movements cause the executions (e.g., transmissions) of the message. In alternative systems, the optional output aides are not used and the systems conserve power by maintaining the system in a standby state (e.g., the dormant state) until the interactive state (e.g., the active state) is enabled.

Figure 16:
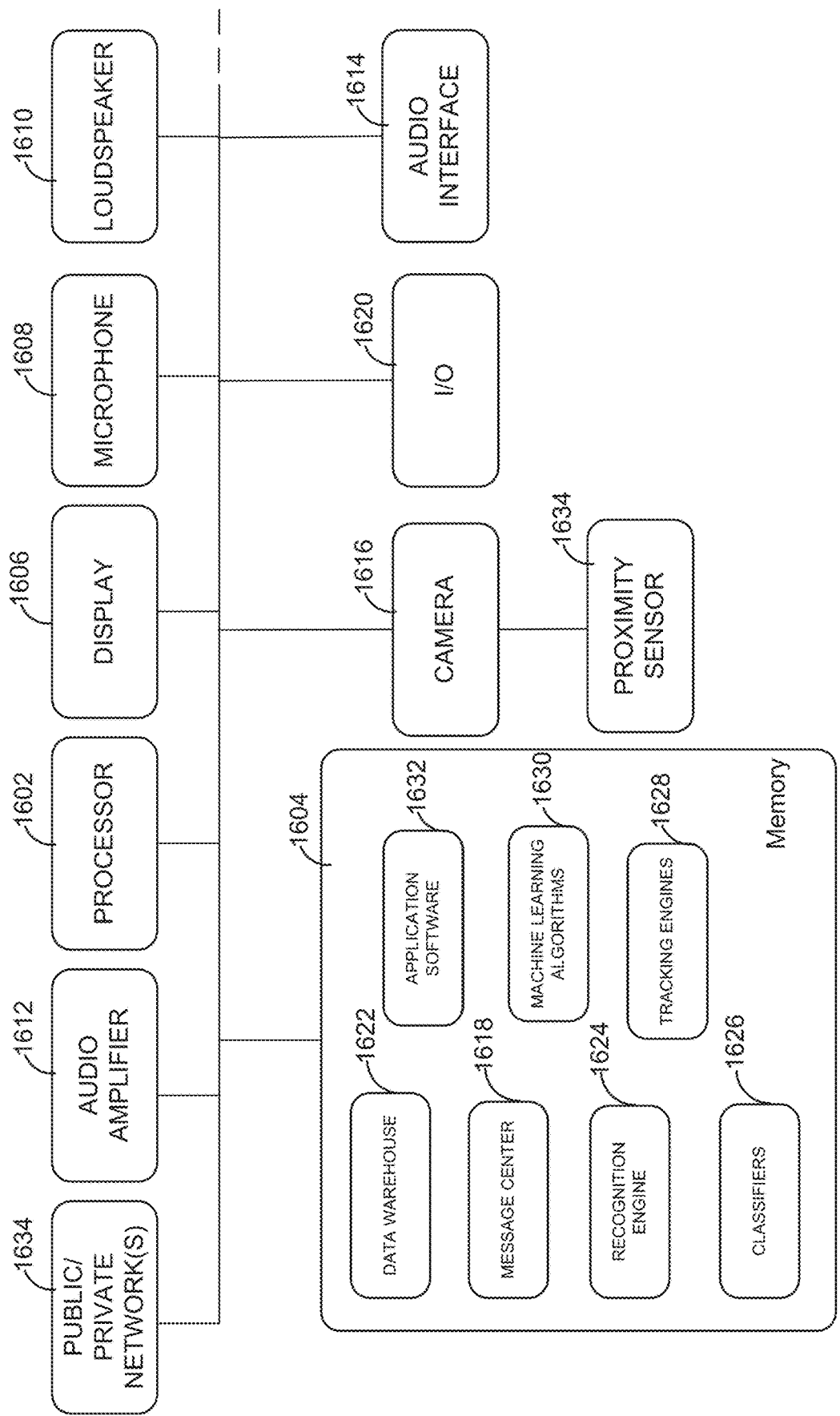
FIG. 16 illustrates the turn-key touchless user interface system.

With the system in an interactive state, the system recognizes a predetermined number of captured gestures that imitate natural communications. Referring to FIGS. 1 and 16, a gesture such as raising a single finger from an occluded hand in a virtual interaction area captured by a camera 1616 at act 106 causes a message center 1618 to render a message at act 110 in response to recognition act 108, and the movement of the finger causes a message center 1618 to execute the message at acts 112 and 114. An execution of a message is intended to broadly encompass an execution of functionality associated with or linked to a message such as an execution of a desired action, for example. The message may be a list of options from which a user makes a selection, which causes the remote device to perform a desired action (e.g., an execution), such as executing a command, rendering content, executing a program, actuating a jump link, transmitting information or data to a destination, and/or etc. that are collectively and individually encompass an execution of a message. In this system, the gesture is the input recognized by the system that causes a rendering of a message and the gesture's movement causes the execution and/or transmission of the message. In some use cases, the cycle (e.g., the selection and then execution) repeats itself as with each recognition results in another rendering and execution.

It should be appreciated that unlike some systems, gesture recognition does not occur only in response to movements (e.g., a hand, finger, or body movement). Instead, there are static recognition events, such as unique hand-shape recognitions of an occluded hand and extended finger, for example, and dynamic hand-shape recognition events that results in the recognition of a movement, and/or the trajectory of the movement that results in an execution of the message. At both recognition events, feedback is provided. In response to a successful static recognition event, a message is rendered that may be executed by a gesture movement (e.g., a dynamic recognition event). In response to a successful dynamic recognition, a message execution occurs such as the execution of an action associated with the message (e.g., actuating a computer script, a program, a universal resource identifier, a jump link, a transmission of information and/or etc.).

In some systems, only a fixed number of static and/or dynamic gestures are recognized; in other systems, a plurality of gestures is recognized. Some may be customized by a user. In the systems, feedback is provided to the user to confirm the correctness of a recognized interaction. The algorithms described herein (e.g., that are implemented via software instructions) are trained on a gesture vocabulary. The software may prevent or inhibit one or more predetermined actions or tasks from being carried out when the static and/or dynamic gestures are not recognized such as a gesture that is not part of the recognition lexicon. It may prevent a desired action if a raised finger from an occluded hand or the raising of a user's quarter arm, is not recognized for example.

To improve responsiveness, some optional functionality of the systems loads dynamic hand-shape recognition event software applications in the background before a successful dynamic hand-shape recognition events occur. In these systems, the systems begin to load the dynamic execution functionality when the execution of a static recognition event begins. If the static recognition event is unsuccessful or terminated, the system terminates the loading of the dynamic hand-shape recognition event software applications that renders the dynamic execution functionality and awaits the capture of another gesture. If the static recognition event is successful and a dynamic recognition event is completed, the functionality in the system completes the message execution with no delay. If the dynamic recognition event is terminated or not completed, the systems terminate or suspends the message execution until a successful dynamic hand-shape recognition event occurs.

In some systems, the lexicon used to control applications rely on upper limb and/or appendage movements in place of or in addition to hand-shape recognitions. A predefined gesture such as the movement or position of a quarter arm (e.g., such as in a raised or predetermined position), for example, executes a command via an alternate recognition event.

Each of the disclosed systems require only a single camera 1616. In alternate systems, two or more cameras 1616 (e.g., a multi-camera system) are used to improve the accuracy of the detections (e.g., the respective hand and/or body limb gesture detection), the respective hand and/or body limb recognition, and the measure of respective hand and/or body limb's movement and/or trajectory. Hand-shape and/or body detection describes when the hand-shape and/or body-part is in the virtual interaction area of the camera's view. The hand-shape and/or body-part recognition is based on how close the captured images are to the machine learned images. The learned images are processed by two or more algorithms such as the two or more machine learning algorithms described herein. Tracking describes the ability of the system to track the hand-shape and/or body-part's movement from frame-to-frame through a localization recognition of activity, for example, such as a fine-grained action processed by one or more tracking algorithms.

Figure 2:
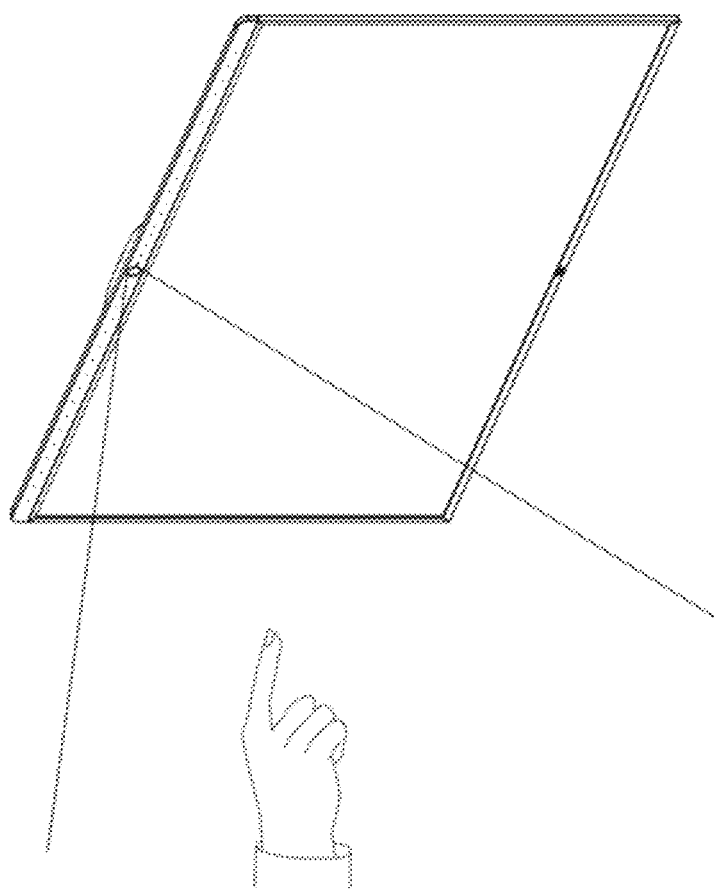
FIG. 2 illustrates a virtual interaction area.
Figure 3:
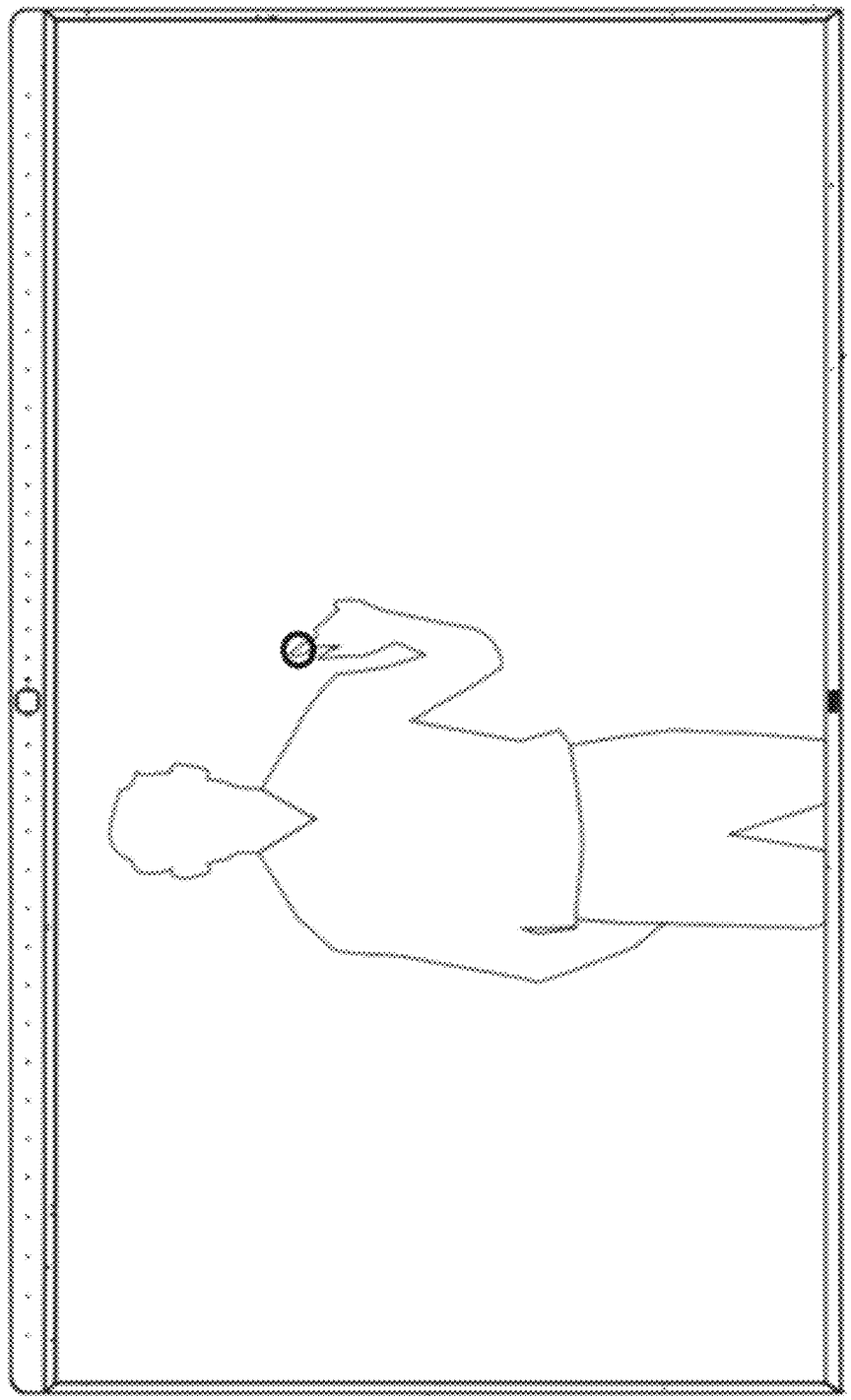
FIG. 3 illustrates a detection and labeling of a pointing finger location.
Figure 4:
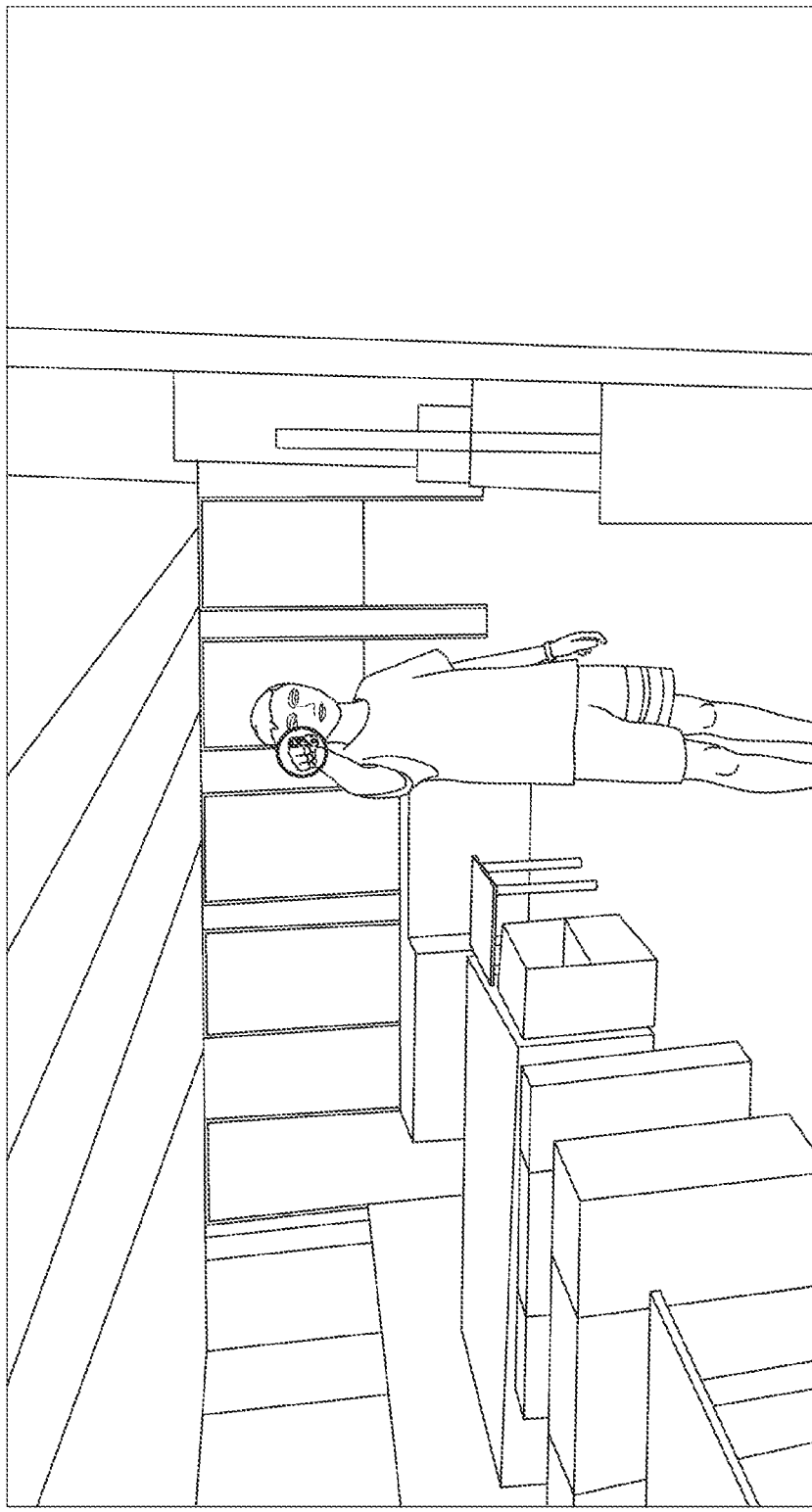
FIG. 4 illustrates a detection and labeling of a pointing finger location.

FIG. 2 illustrates a virtual interaction area, in which a proximity detector 1634 detects a user pointing to a system, which is shown as a screen rendered by a hardware/computer display (both identified by reference number 1606). In the system of FIG. 2, the camera 1616 has a virtual detection range (e.g., about a one-hundred and twenty degrees) and a virtual detection distance (e.g., about twenty-feet) that is collectively referred to as the virtual interaction area. As best shown in FIGS. 3 and 4, the system detects and labels the finger location as the user points to the camera 1616 or a predetermined designated area on a screen 1606 as highlighted by the circle enclosing an exemplary user's hand.

At the system level, the system receives raw video streams from single or multiple cameras 1616 that are processed by machine learning and tracking algorithms. In some applications, the detection resolves a complex series of events as the system processes many hand shapes, skin colors, and hand sizes under variable lighting conditions. In FIGS. 2-4, a useful gesture (i.e., a gesture that has a message or a command association) shown as an exemplary finger pointing is detected. In these exemplary use cases, the finger-pointing gesture is used because a finger extension occurs in a temporally short period of time, is a natural body movement, requires minimal muscle tension, and in the disclosed system, is cognitively associated with a user initiating a communication. An exemplary process detects the finger pointing to a predetermined screen location, such as a location that is associated with a predetermined absolute position on the screen for a predetermined period of time (e.g., measured in seconds). The recognition begins with a detected motion of the finger extension or movement of the extended finger from an occluded hand for the prescribed time period which is processed by an exemplary function such as, for example, (x, y)=find_finger(image)

Image: single frame captured by the camera (x, y): the coordinates of finger position Gesture >location >App Once the location of the finger is determined, the distance between users and the system is measured from the static images captured from the camera 1616. Through these values, recognitions and tracking engines 1628 tracking occurs. Further, movement causes the system to execute the gesture-initiated messages. Execution or the level of execution may occur in response to a change in position, an association with a detected trajectory, a calculated speed (e.g., translated into a magnitude), and/or a detected direction of the movement (e.g., collectively referred to as the described metrics) of the gesture in some systems that may be determined by the application software it communicates with.

Figure 5:
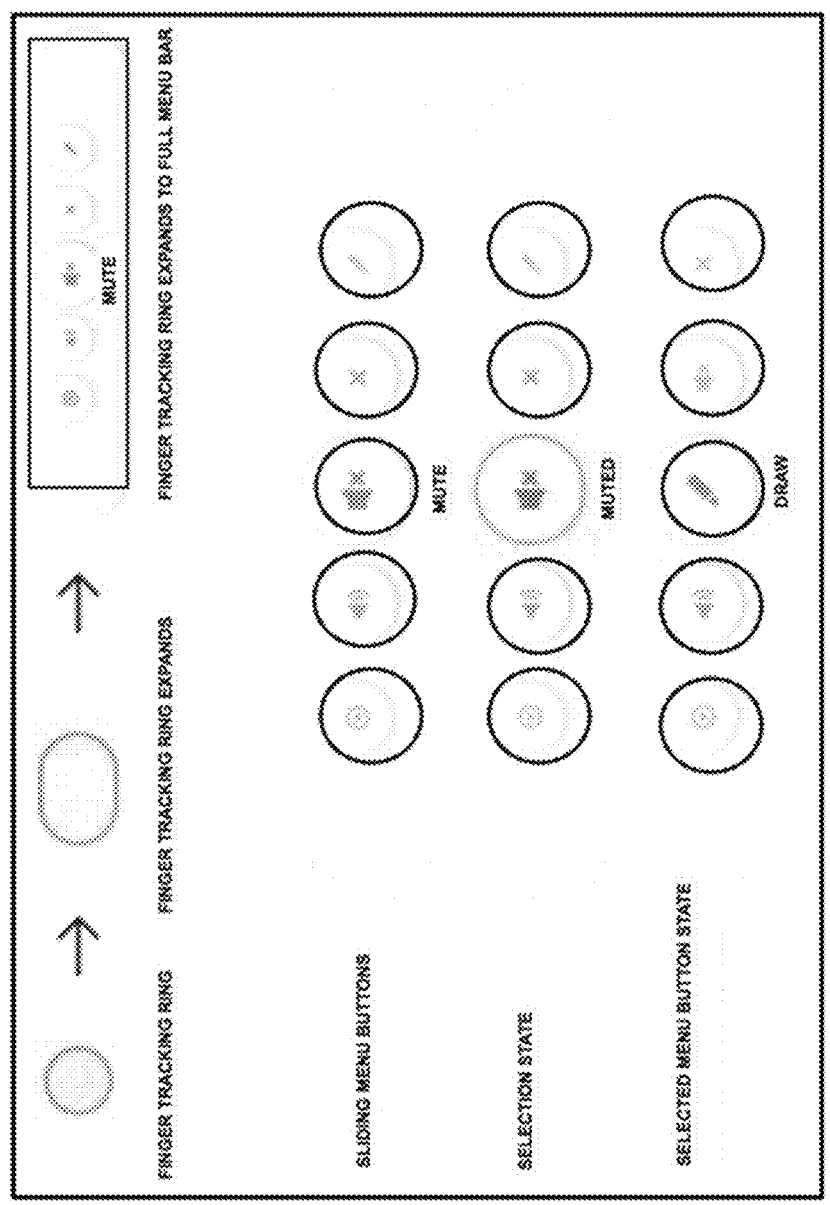
FIG. 5 illustrates an exemplary touchless actuated menu.
Figure 6:
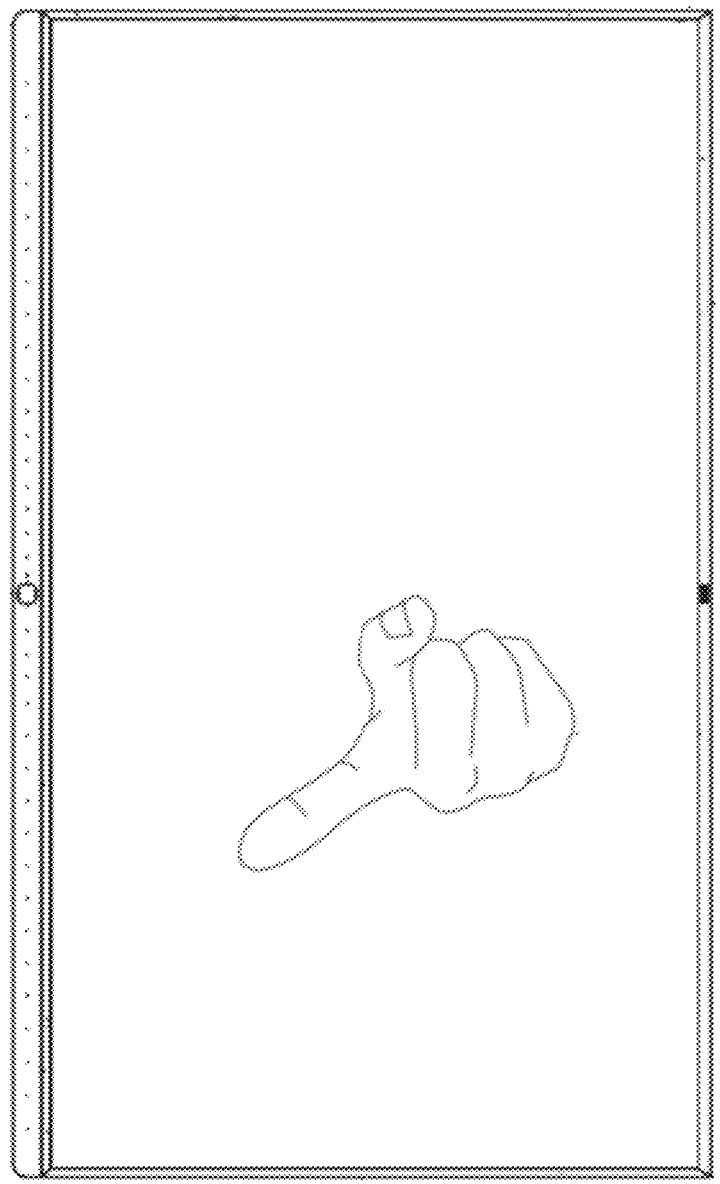
FIG. 6 illustrates a simulated computer hover.

For example, when a user points to the screen 1606, any of the described metrics alone or in combination may render a list of options available to a system user in the form of messages displayed on the screen 1606 that may be presented in any form including the exemplary menu as shown in FIG. 5. The menu may include radio buttons, toggle buttons, sliders, etc. in which the translated movement of the user's finger extending from an occluded hand allows the user to make hover selections much like a mouseover as best shown in FIG. 6. A selection occurs when a user interacts with an object or screen area, but does not necessarily attempt an activation. An activation is triggered when the user moves in predetermined direction from an object such as in a substantially vertical direction higher than a starting position as shown by the movement of the menu object in FIG. 8. In an exemplary application, menu selections and tunable parameters provide the user with the flexibility to interact with and configure application software, and in some use systems, provide the flexibility to configure the touchless system making the system user adaptable in a come as you are format without requiring facial or voice input.

Application software is a term that is intended broadly to encompass software created for a specific purpose. It is a program or collection of programs used directly by end users. While system software consists of low-level programs that interact with computers at a basic level like operating system software, application software resides above system software, interacts with it, and includes software designed to assist in the performance of one or more specific tasks such as database programs word processors, drawing programs, and/or spreadsheets, for example.

Figure 7:
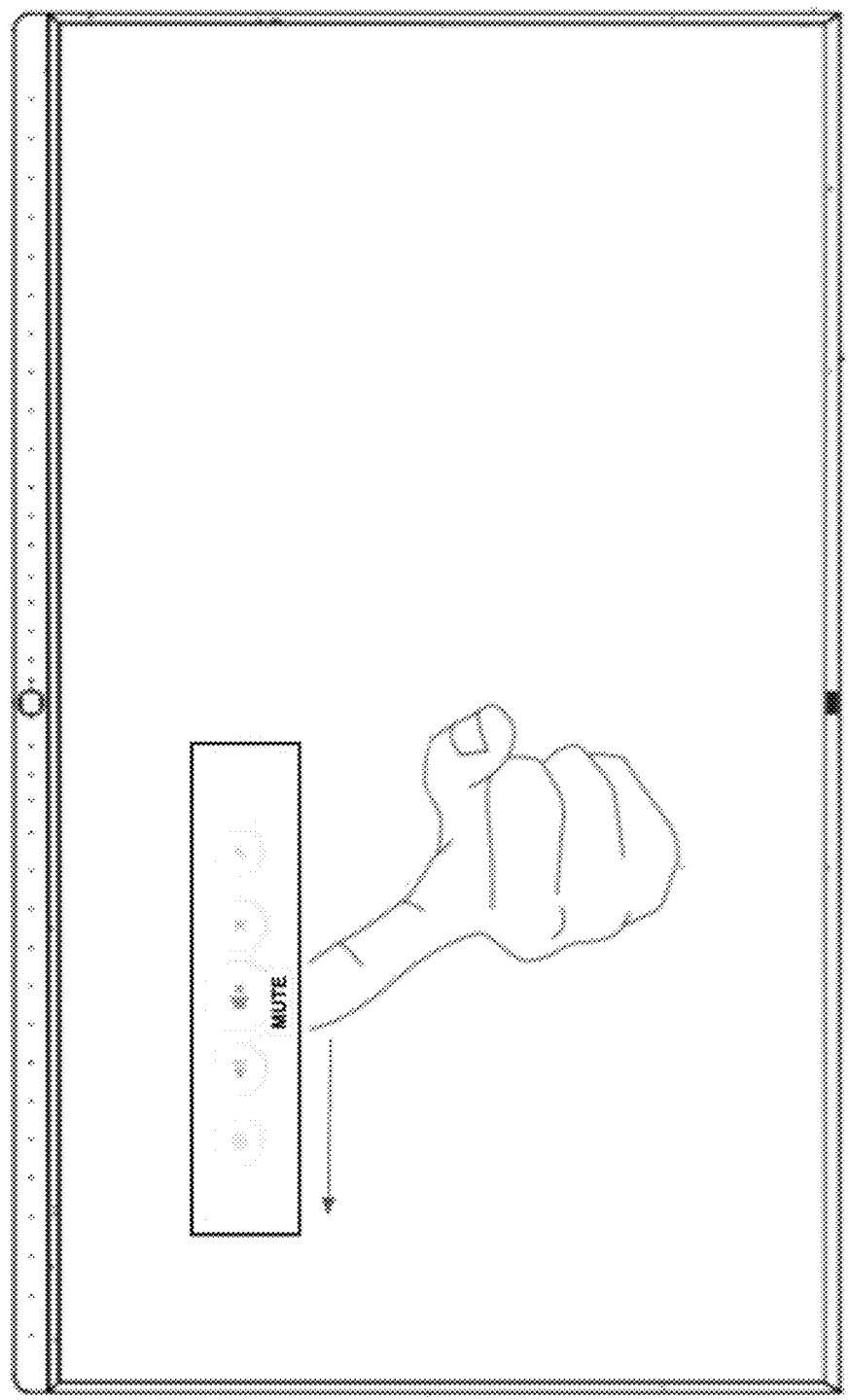
FIG. 7 illustrates an emulated a swipe action moving an exemplary menu item.

When a user moves her/his hand or finger in a predetermined direction, such as moving her/his hand to the left as shown in FIG. 7 when over an object, a swipe or scrolling action is emulated and displayed on a screen. In the context of an emulated selection window (e.g., in a graphical user interface, a selection window is a window displayed by the system or application software to solicit a user input), the selection window moves to the left when the user moves her/his occluded hand and extended finger to the left and moves to the right when the user moves her/his occluded hand and extended finger to the right (not shown) when facing the screen 1606.

In some applications, the transitioning from one position to the next in a fixed area (e.g., within the predefined and limited virtual interaction area) corresponds to the relative movements on the screen 1606. Here, a pointing finger represents a pointing device in which movement of the selected object is linked to the movement of the pointing finger but not to the precise position of the pointing finger. For example, if a user disengages an object selection (here, the window selection) and then reengages at a position not identical to the user's last location, the position of the object does not change because no movement of the pointing finger is detected. When the user moves her/his pointing finger again after a selection, the selected object moves to reflect the pointing finger's movement. The relative pointing mode differs from an absolute pointing mode enabled with or in addition to the relative pointing mode in some alternate systems because the precise location of the finger pointing within the virtual interaction area in absolute pointing modes is always associated with a predefined on-screen position.

Figure 8:
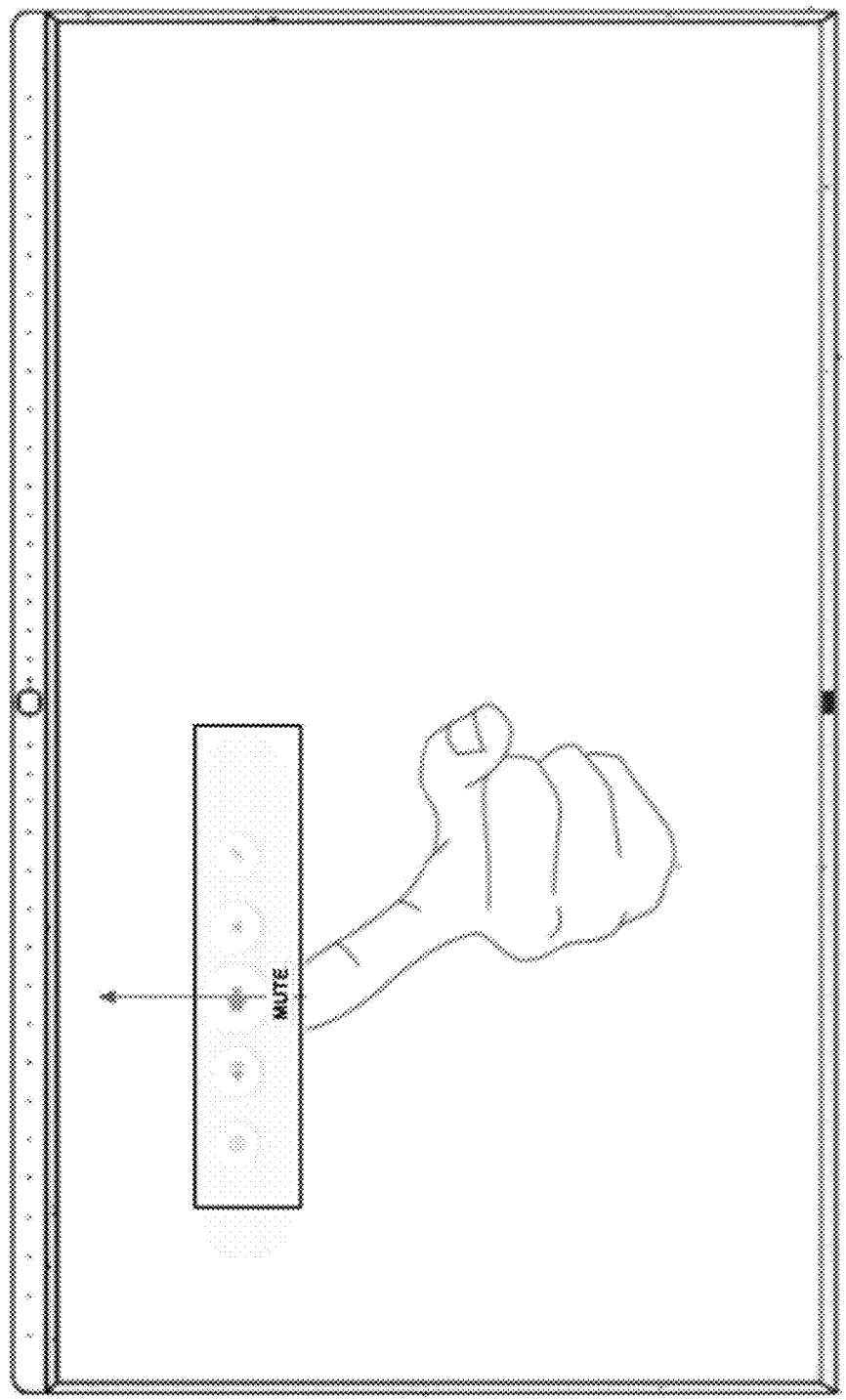
FIG. 8 illustrates an emulated activation or clicking of an exemplary menu option.

In some systems, menu and item selections are changed which activate a state, activate a program, and/or activate a program feature. Activation and deactivation occur by moving a finger extended from an occluded hand (referred to as a finger(s) or pointing finger in this disclosure) in predefined directions such as in an upward or downward direction a substantially vertical motion, respectively, relative to a last detected gesture position, selected object, or relative to a designated camera. For example, moving a pointing finger in an upward direction relative to the position of the user's finger's last detected position or designated camera 1616 emulates the clicking of a button of a detection device (e.g., clicking a mouse button that enables a function) or the making of a selection as shown in FIG. 8. Moving an extended finger in a downward direction relative to the position of the user's extended finger's last detected position or designated camera cancels a selection and/or causes the message that may be a menu to disappear in some use cases. In some systems, the actuation and/or deselection is preceded by a hover selection. In these systems, a pointing finger's movement executes the actuation or deselection of the functionality, respectively, of the object or menu selected by the hover selection depending on the predesignated directions of the movement.

In addition to or in place of visual feedback, some systems provide non-visual feedback to confirm the recognition of a user's input or progress toward the completion of a desired task or a deactivation of a state or task. The feedback may comprise physical feedback such as a tactile feedback conveyed to the user indirectly via vibrations conveyed through surrounding surfaces and/or an aural feedback rendered through audio interfaces 1614, audio amplifiers 1614, and loudspeakers 1610.

Figure 9:
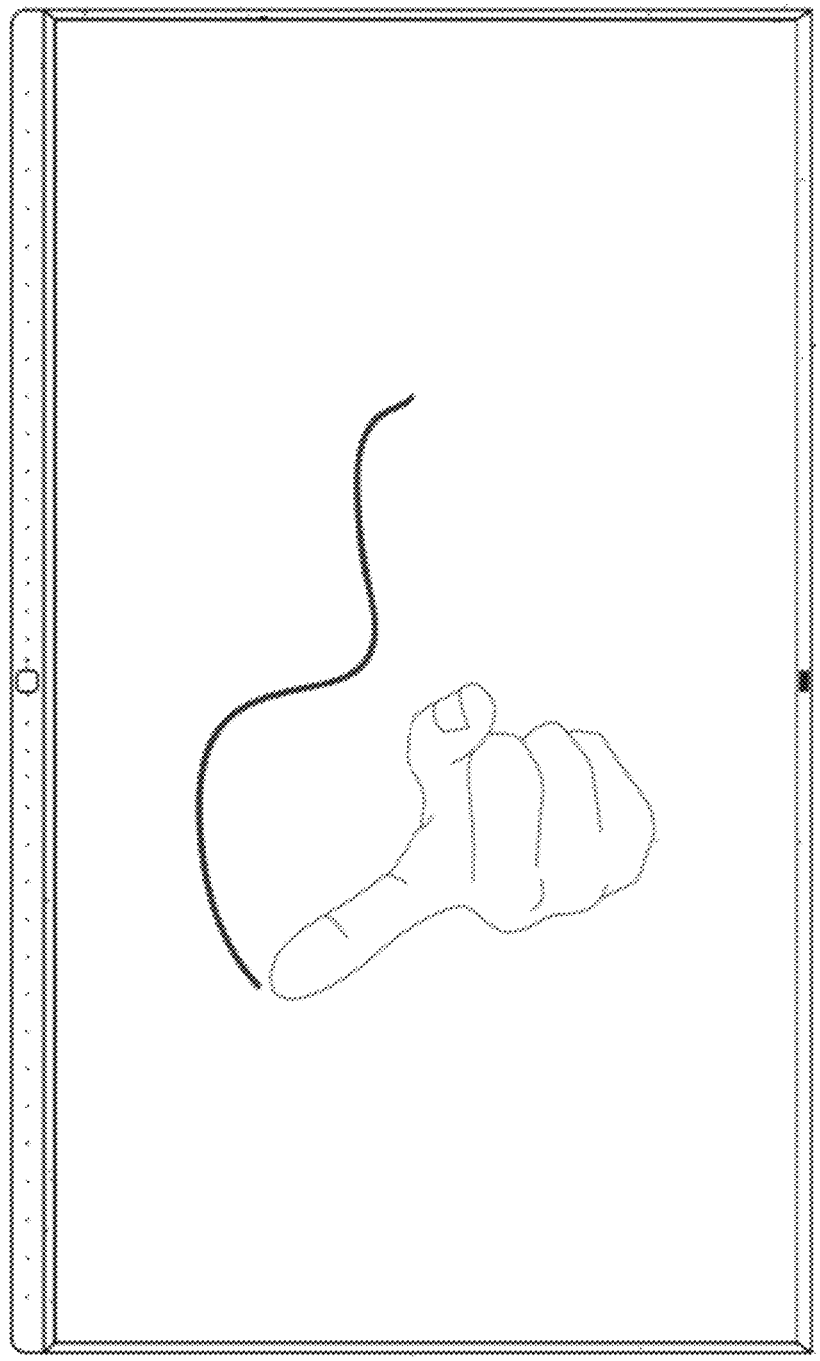
FIG. 9 illustrates a drawing function on an emulated whiteboard or selectable background.

Touchless drawings may also be rendered in some systems without the use of data gloves, orientation sensors, or any other tethered devices that directly record movement and drawing angles. The disclosed system reduces the set-up time and time-to-interface of drawing and highlighting program functions. The passive and silent sensing of the disclosed system allows users to generate drawings and images, interact with them, and highlight drawings, images, and text. In a presentation mode, for example, the disclosed systems provide users with uninterrupted usage of software (disabling other scheduled tasks and/or software), here, drawing software activated by the selection of a drawing mode that enables a user to draw on a screen. The screen emulates a whiteboard as shown in FIG. 9 or a user selected canvass background (not shown) in alternate systems. When actuated by a gesture-message that may be presented via a menu, users generate drawings using their fingers without making direct or indirect physical contact with the screen or drawing devices through the touchless interface. Pointing a finger at a predetermined position for a predetermined period of time in this mode like a hover, for example, in an exemplary gesture-message combination launches the drawing mode after displaying a message, and launches a cursor shown in the shape of an occluded hand and pointing finger in which lines may be drawn and/or annotations added to a displayed output.

Figure 10:
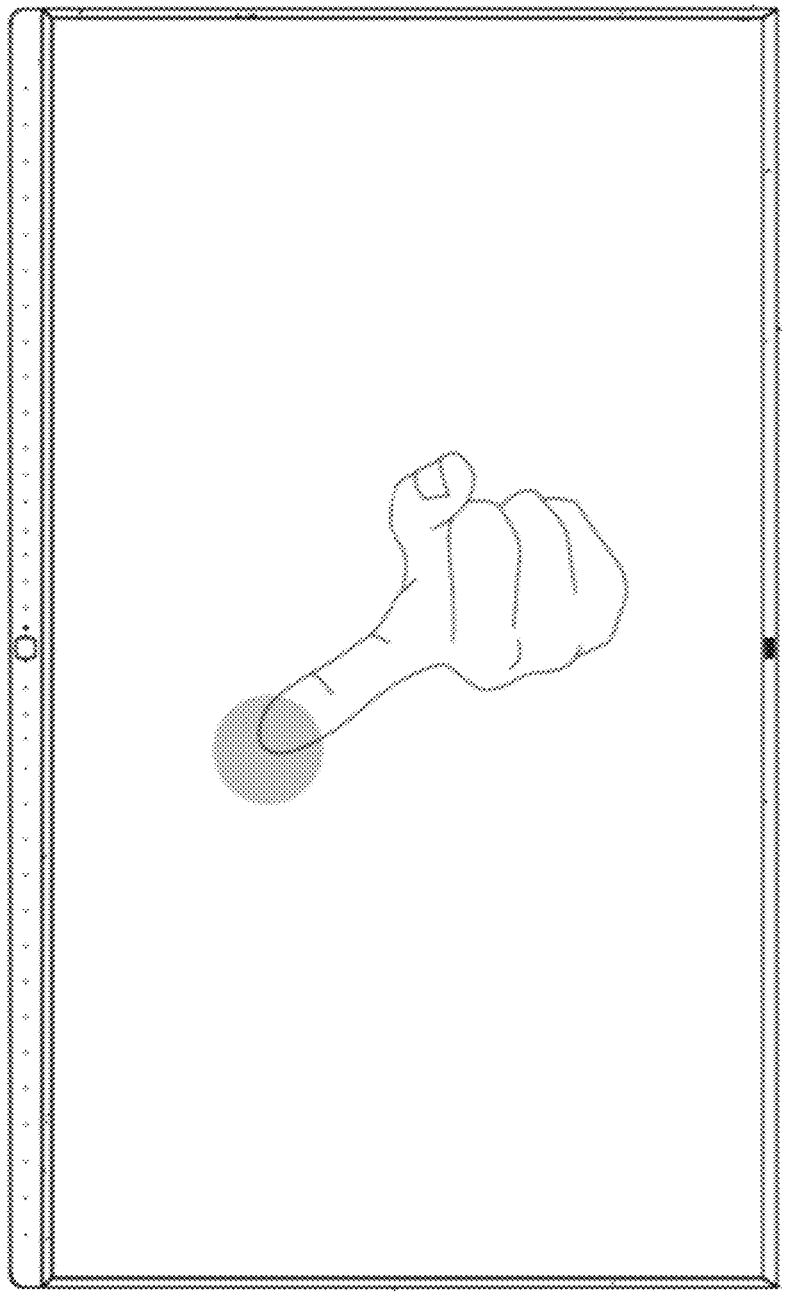
FIG. 10 illustrates an emulated laser pointing function.

An alternative gesture-message launches a highlight mode that enables the user to emulate a laser pointer by a finger pointing. As shown in FIG. 10, in a highlight mode user can emulate the production of coherent beam of monochromatic light to direct a user's attention usually during presentations rendered on the screen 1606 with or without the hand cursor shown. Alternative-gesture messages launch other modes that result in messaging and selections, rather than linking gestures to commands.

Figure 11:
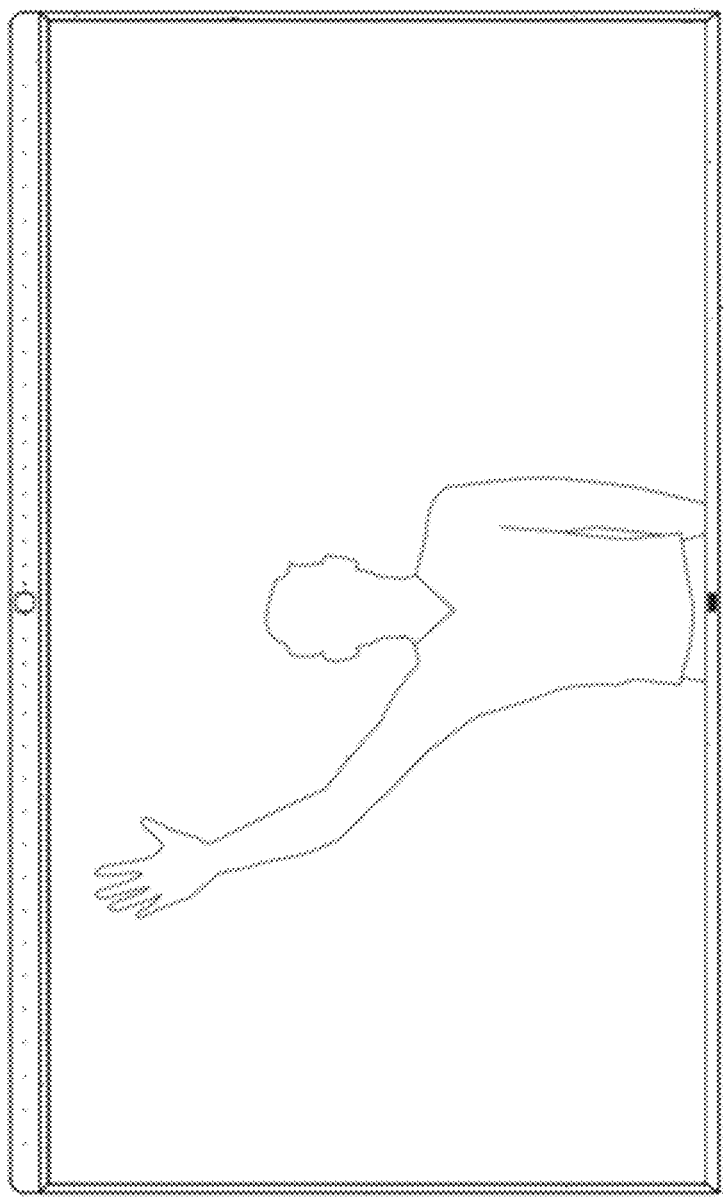
FIG. 11 illustrates an exemplary wakeup-gesture.
Figure 12:
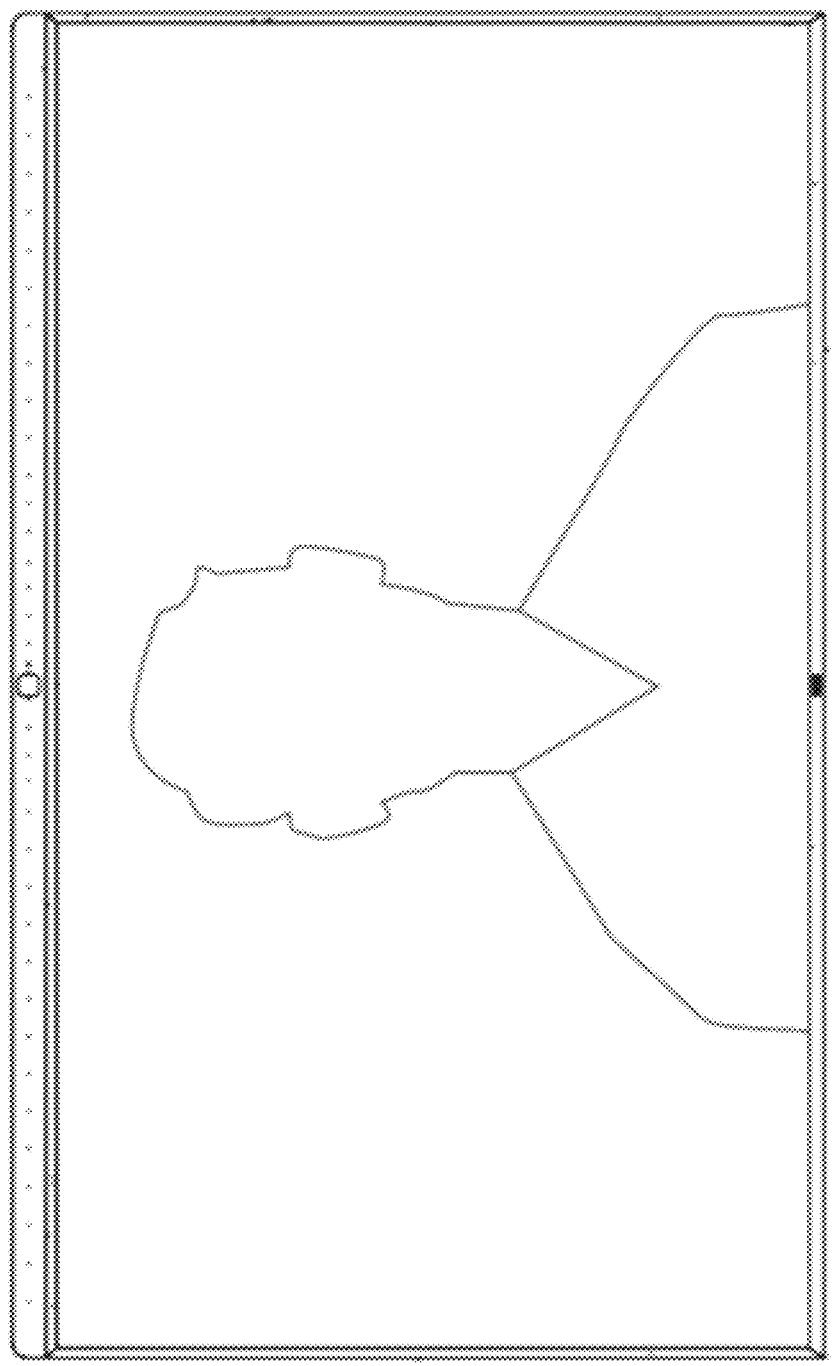
FIG. 12 illustrates the output of an automated filtering function that selectively narrows the bandpass or virtual interaction area of a turn-key touchless user interface system.
Figure 13:
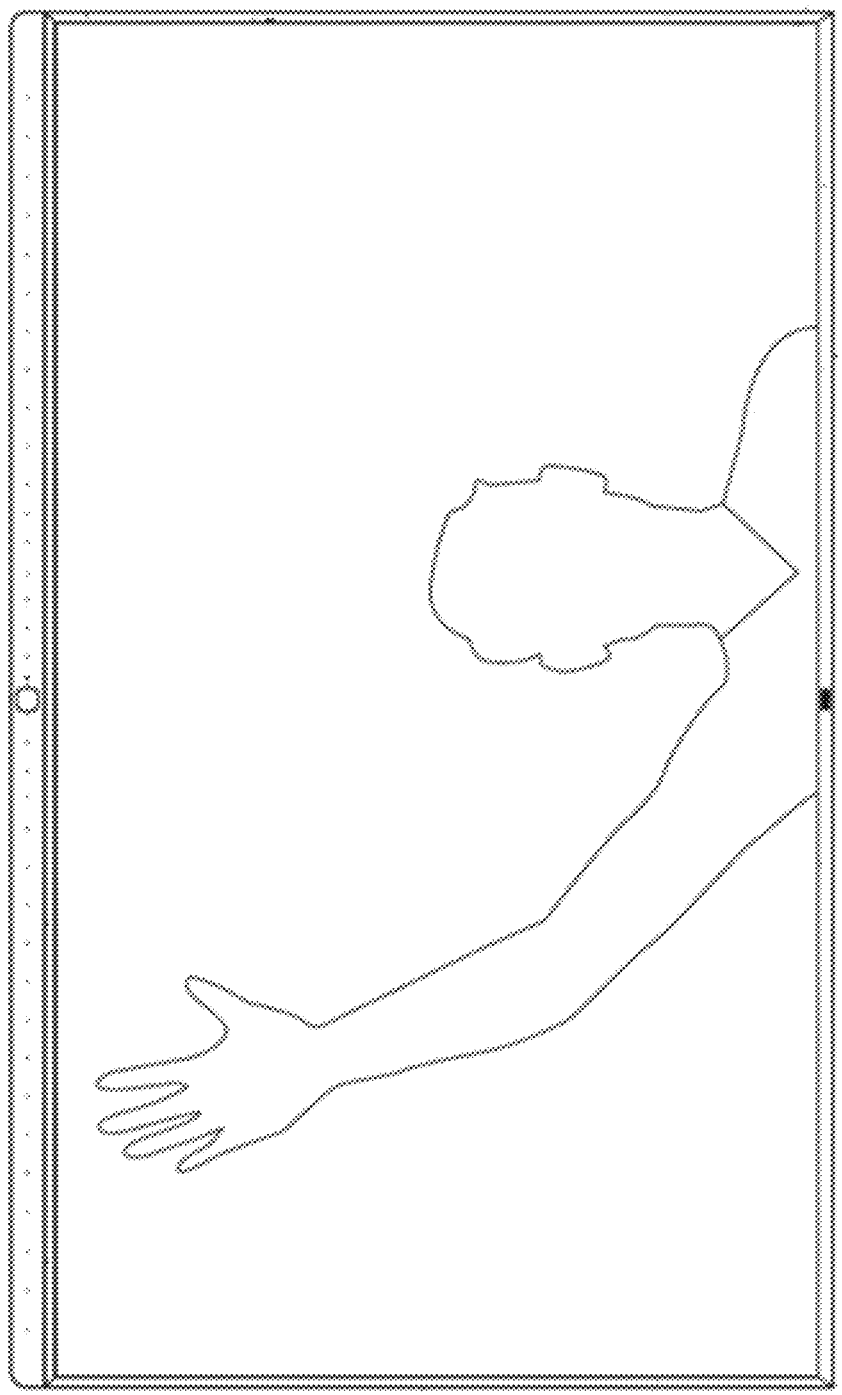
FIG. 13 illustrates an exemplary arm gesture.
Figure 14:
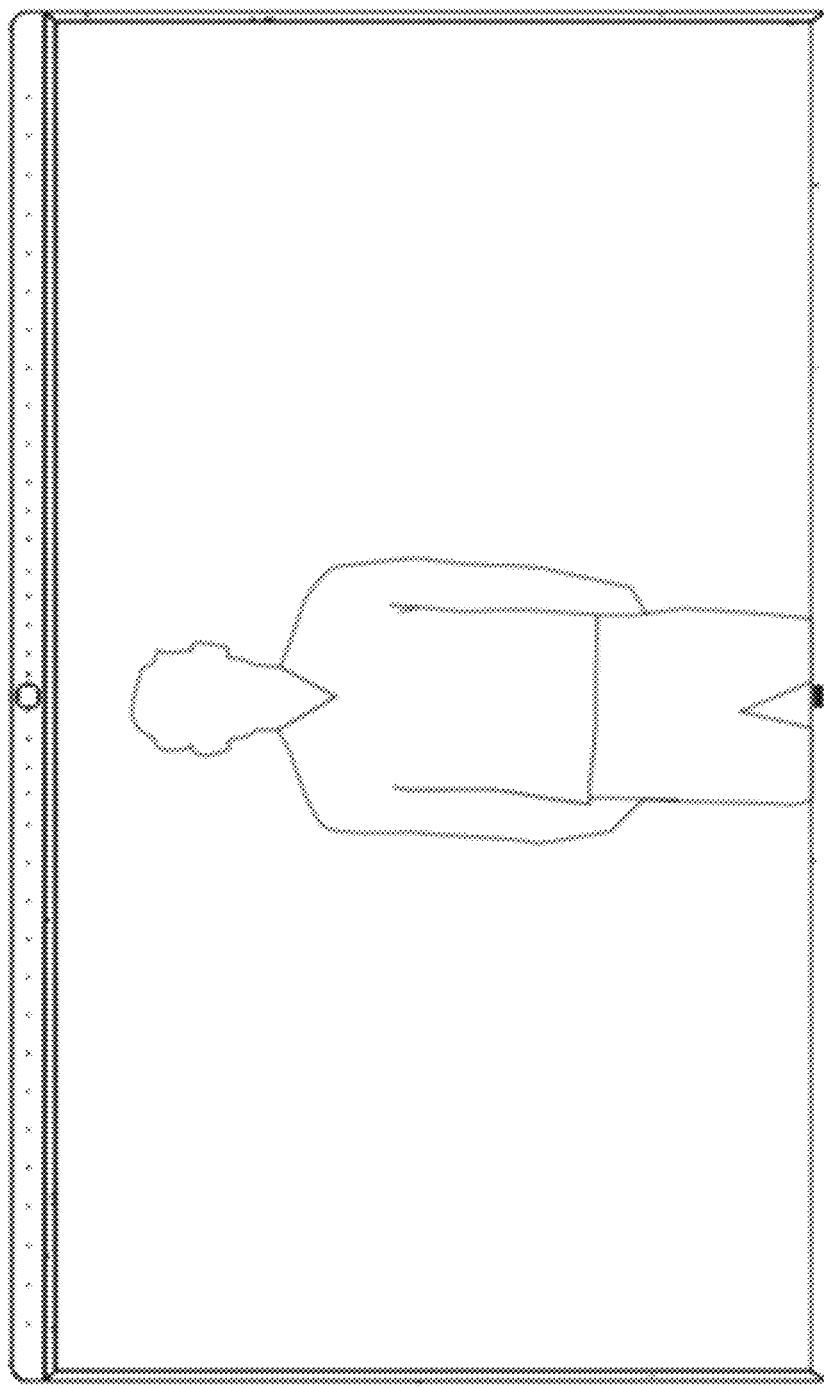
FIG. 14 illustrates the output of an automated modification to the automated filtering function that increases the bandpass or virtual interaction area of the turn-key touchless user interface system.

Because the interaction space may include a number of users and/or participants in different postures (e.g., some may be standing, others may be sitting, etc.), some systems distinguish an intended user's interaction from other user interactions (e.g., it filters them out) through filtering arm-gesture recognitions. For example, when a user fully extends her/his hand above her/his head as shown in FIG. 11, the system transitions from the stand-by state to the interactive state (as occurs during a detection), grants that user control of the system, and distinguishes that user's useful gestures from other people's gestures in the virtual interaction area. For example, the system may grant a moderator exclusive control of the system that is used during a panel discussion. In some systems, arm-gesture recognition causes the camera to zoom into and remain focused onto only that user (e.g., the moderator) as shown in FIG. 12, effectively blocking or filtering out others (e.g., the panelists) from controlling the system until control is released. It reduces the optical bandpass of the system (e.g., passing images of the moderator, but blocking images of the panelists) automatically. In some systems, control is released be repeating the arm-gesture command as shown in FIGS. 13 and 14 or is automatically released after a predetermined time period (e.g., minutes, seconds, etc.) of inactivity, both of which cause the system to revert to an original interactive operating state and returns the camera 1616 to a wider angle view. This effectively increases the optical bandpass (e.g., passing images of the moderator and the panelists) of the system.

Figure 15:
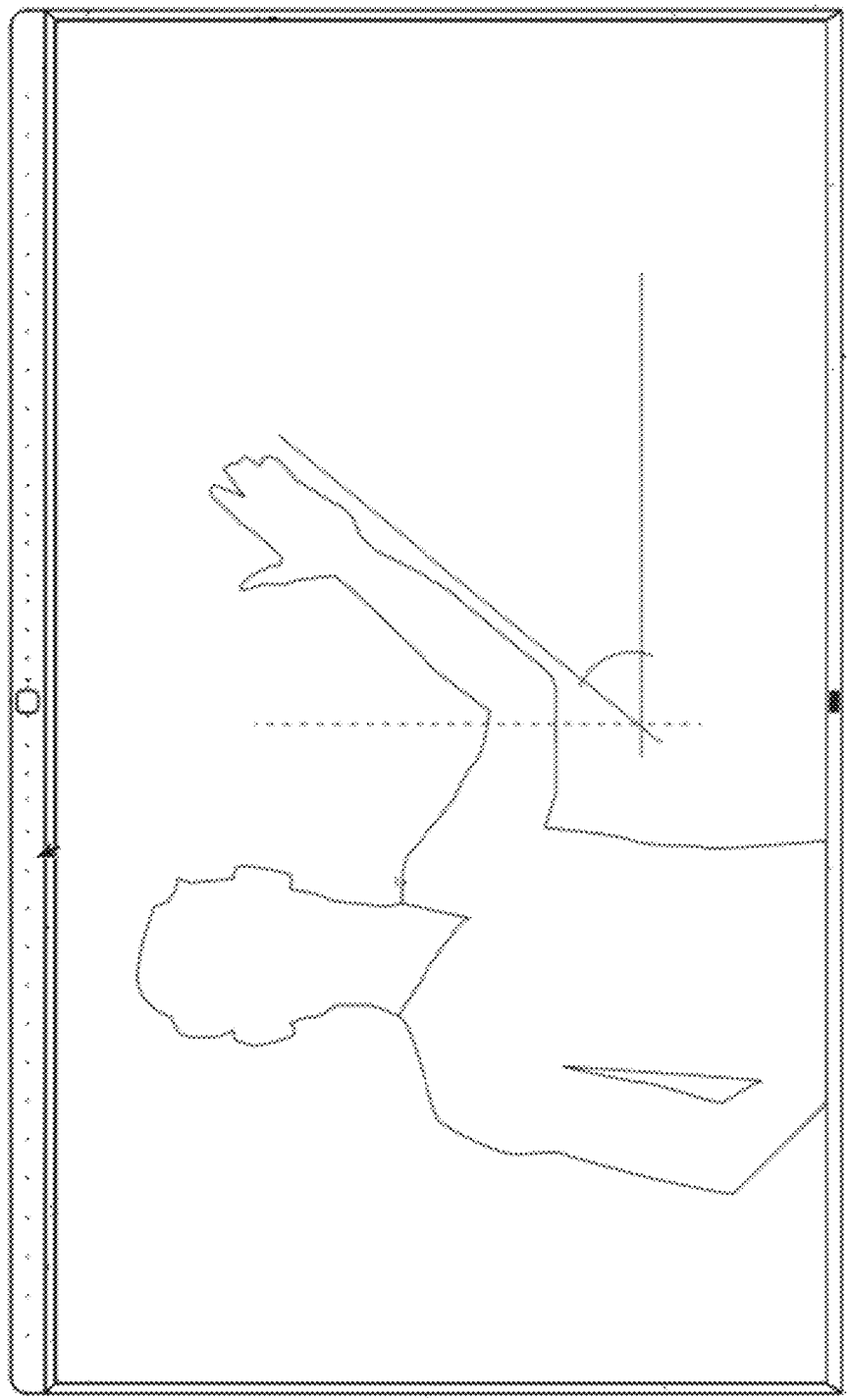
FIG. 15 illustrates a quarter-arm gesture.

Arm-gesture commands (e.g., commands associated with quarter arm gestures) may be associated with prominent identifying features (e.g., landmark features) that occur when a user raises her/his hand from a resting horizontal position to a fully extended or substantially vertical position. In some systems, one or more arm-gesture commands are associated with an angle formed between a virtual horizontal line (shown in the FIG. 15) and the extended arm, with a vertex occurring at or near the user's elbow. In this system, a first command may be associated, detected, and/or executed when the user's arm is fully extended and forms a first predetermined angle with the virtual horizontal line such as the substantially perpendicular angle. A second command may be associated, detected, and/or executed when the user's arm forms a second predetermined angle with the virtual horizontal line, such as the substantially forty-five-degree angle shown in FIG. 15. And, a third command may be associated, detected, and/or executed when the user's arm forms a third predetermined angle with the virtual horizontal line, such as the substantially zero-degree angle. In alternate systems, any number of detected predetermined arm-gesture angles represent and execute a plurality of different arm-gesture commands (such as the execution of messages that includer transmissions, for example) and may execute any other selected commands (e.g., the first command may make a selection and the second command may execute or cause the transmission of the selection, etc.) in other systems. In some systems, the raising of the user's arm causes an execution of a message in the absence of a finger movement just as the movement of a pointed finger alone can cause an execution.

In the systems described herein, one or more machine learning algorithms detect, classify, and track the gestures that interact with the system and train the respective classifiers. An exemplary machine learning algorithm trains gesture classifiers 1626 to detect image objects that are prone to occlusion, such as the joints of a hand for example. The detections are triangulated in three dimensions (e.g., a three-dimension triangulation) to render multiple views of a hand. Based on repeated training of the multiple views of the hands shown in the video images captured by the camera(s), the machine learning algorithms train gesture classifiers 1626 that detect hand key points and mark the capture of hands in motion and render confidence scores as the system's video is processed. A second machine learning algorithm of the same type detect, classify, and track appendage movements, captured in video images such as arm movements, for example, that are used to train other gesture classifiers 1626 (e.g., the second gesture classifiers) that identify appendage key point detection using the same algorithm described herein. In some systems, the processing described in this disclosure occurs in real-time. The term real-time is intended to broadly encompass systems that process information at the same rate they receive data, enabling them to direct or control a process as an automatic pilot and the touchless interface described herein.

Rather than relying on a single type of machine learning algorithm to detect and classify hand and appendage identification and movements, the disclosed systems also process the captured video images using a second (different) type of machine learning algorithm (different from the first) in parallel to improve the accuracy and speed of the system's recognitions. In the system, a third classifier 1626 predicts bounding boxes enclosing a desired body and hand segments shown in the video images using dimensions and clusters as anchor boxes to predict hand-gesture and appendage-gesture recognition. The systems predict four coordinates for each bounding box (e.g., each hand-gesture and appendage-gesture tracked). Applying a linguistic regression, a predicted object score is generated. When a bounding box's object score exceeds a predetermined threshold, a feature extraction is executed by a feature extractor processing the video images using successive 3×3 and 1×1 convolutional layers (e.g., fifty-three convolutional layers in an exemplary machine learning algorithm) until a predetermined mean-squared error is achieved. Each of the second-type of gesture classifiers 1626 are trained using full video images captured by the camera(s) 1616 using a multi-scaling processes to render more trained gesture classifiers that render recognition predictions and confidence scores. Once trained, the gesture classifiers process the captured video by processing video images in real-time.

In operation, the extracted features of a captured gesture in a video image are processed by the various types of classifiers 1626 and the identifications with the highest confidence score are selected by the processor 1602. In other systems, a boosting configuration is used in which classifiers 1626 are serially combined to reduce residual error. Frame-to-frame comparisons of the classified gestures are then compared by tracking engines 1628, which are used to track position and movement of the classified hand or upper limb. In some systems, the comparison is made against a learned background model to efficiently calculate hand and/or limb movement and their trajectories. Speed is also calculated in some alternate systems. To improve system accuracy, machine learning detections are repeated at periodic time intervals during tracking periods. In some systems, the systems re-find objects (e.g., execute a completely new locating/detecting process) in a predetermined time period such as every five-to-ten seconds before re-engaging the tracking engines 1628 from the confirmed or new locations of the object. In response to a static and/or dynamic recognition (e.g., trajectory recognitions), the gesture-message associations; gesture-command associations, trajectory-message associations, and/or trajectory-command associations are identified by cross-referencing messages/commands with messages/commands previously stored in a data warehouse 1622, which thereafter causes the remote device (the receiving device) to render a message, execute a message such as its transmission, or execute a command.

FIG. 16 is a block diagram of touchless user interface that may execute the process flows, functions, and systems described above and those shown in FIGS. 1-15. The system comprises a processor unit or graphical processor unit 1602, a non-transitory media such as a memory 1604 (the contents of which are accessible by one or more processors and/or graphical processors 1602), a public/private network 1634, a data warehouse 1622, a display 1606, a microphone array 1608, a loudspeaker 1610, an audio amplifier 1612, an audio interface 1614, one or more cameras 1616, a proximity sensor 1634, a message center 1618, and an I/O interface 1620. The I/O interface 1620 connects devices and local and/or remote applications such as, for example, additional local and/or remote monitored cameras 1616. The memory 1604 stores instructions, which when executed by the processor 1602, causes the system to render some or all of the functionality associated with vision-based messaging and control. The memory 1604 stores instructions, which when executed by the processor 1602, causes the system to automatically render functionality and hardware that enables the static and dynamic recognition events (e.g., the recognition engines) 1624, message centers 1618, gesture classifiers 1626, tracking engines 1628, machine learning algorithms 1630, and one or more hand-gesture arm-gesture based application software 1632. Some functionality may be rendered by OpenPose and Yolov3 and CSRT tracking software, for example in alternate systems. In yet another alternate touchless system, the non-transitory media provided functionality is provided through cloud storage. The term cloud storage is intended to broadly encompass hardware and software that enables data to be maintained, managed, and backed up remotely and made available to users over a network (typically a publicly available distributed network like the Internet). In this touchless system, cloud storage provides ubiquitous access to the system's resources including detections, recognitions, and tracking and higher-level services that can be rapidly provisioned over a public network. Cloud storage allows for the sharing of resources to achieve coherence services across many touchless systems at many locations and provides economies of scale.

The memory 1604 and/or storage disclosed may retain an ordered listing of executable instructions for implementing the functions described above in a non-transitory computer code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory 604 may comprise a single device or multiple devices that may be disposed on one or more dedicated memory devices or disposed on a processor or other similar device. The term "engine" is intended to broadly encompass a processor or a portion of a program that executes or supports events such as the static and dynamic recognition events and processes.

When functions, steps, etc. are said to be "responsive to" or occur "in response to" another function or step, etc., the functions or steps necessarily occur as a result of another function or step, etc. It is not sufficient that a function or act merely follow or occur subsequent to another.

Alternate systems are not limited to the particular hardware and machine learning algorithms described above. Other suitable hardware and machine learning algorithms can be used. Furthermore, the systems are not limited to physically static systems. Rather, the systems can be used in mobile devices and operate across distributed networks. The systems illustratively disclosed herein suitably may be practiced in the absence of any element (including hardware and/or software), which is not specifically disclosed herein. They may operate in the absence of those elements. Further, the various elements described in each of the many systems described herein is regarded as divisible with regard to the individual elements described, rather than inseparable as a whole. In other words, alternate systems encompass any variation and combinations of elements described herein and may be made or used without the various elements described (e.g., they may operate in the absence of).

A turn-key touchless user interface and process provides a natural and easy way to communicate and, in some instances, control remote devices without physical or radio frequency contact with the remote devices. The systems enable users to interact with and control computers and other devices through dynamic pointing, hand movements, and arm orientations. The systems use multiple machine learning algorithms to boost and achieve a high recognition accuracy and tracking software to recognize trajectories of various pointed fingers and hands while providing message and/or other forms of feedback. The systems use one or more cameras 1616 to acquire gestures. The systems enable multiple forms of natural human communication, allowing all users of various physical abilities to access and share information in a sterile environment. Further, the system's use of gesture-message associations makes the systems suitable for many different software applications as each gesture-message association can be customized to different cultural backgrounds making the systems easy to understand, use, and adapt to different in application domains. The technologies are robust and can be used in many applications and may be part of commercial systems, medical systems, and entertainment systems, for example.

The subject-matter of the disclosure may also relate, among others, to the following aspects (the aspects are referenced by numbers):

1. A computer implemented method of controlling an electronic device in an absence of a physical contact and a radio frequency communication with the electronic device, comprising:

detecting a user's presence within a virtual detection range of a camera while the electronic device is in a standby state;

transitioning the electronic device to an interactive state when the user's presence is detected; and maintaining the device in an interactive state when a detected gesture from the user corresponds to a predefined gesture stored in a memory that is determined by:

detecting an extended finger by processing a comparison of an image of the extended finger captured by the camera against a plurality of images stored in the memory of the electronic device;

rendering a message on a display of the electronic device as a result of the detecting of the extended finger; and transmitting the message as a result of a detected movement of the extended finger.

2. The computer implemented method of aspect 1 further comprising displaying one or more visual cues while in the standby state, where the one or more visual cue comprises an image of the predefined gesture.

3. The computer implemented method of aspect 2, where the one or more visual cues indicate a movement of the image along a trajectory within the virtual detection range that causes the transmitting of the message.

4. The computer implemented method of any of aspects of 1 to 2 where the predefined gesture stored in memory comprises a gesture-message association stored in the memory that causes the rendering of the message.

5. The computer implemented method of any of aspects of 1 to 4 further comprising maintaining the device in the interactive state as a result of a movement of a recognized predefined gesture.

6. The computer implemented method of any of aspects of 1 to 5 further comprising transmitting the message in response to a detection of an arm-gesture.

7. The computer implemented method of aspect 6 where the arm-gesture comprises moving a quarter arm of the user to a first position.

8. The computer implemented method of aspect 7 where the moving the quarter arm of the user to the first position causes transmitting a second message.

9. The computer implemented method of aspect 8 where the moving the quarter arm of the user to a second position causes transmitting a third message different from the second message.

10. An electronic device comprising;
a display;
a processor in communication with the display; and
a computer program stored in a non-transitory memory executed by the processor that causes actions to be carried out through instructions for:
detecting a user's presence within a virtual detection range of a camera while the electronic device is in a standby state;
transitioning the electronic device to an interactive state when the user's presence is detected;
detecting an extended finger by processing a comparison of an image of the extended finger captured by the camera against a plurality of images stored in the non-transitory memory of the electronic device;
rendering a message on the display of the electronic device as a result of the detecting of the extended finger; and
transmitting the message as a result of a detected movement of the extended finger.

11. The electronic device of aspect 10 where the transmitting the message occurs as a result of the extended finger moving along a predetermined trajectory.

12. The electronic device of any of aspects of 10 to 11 further comprising instructions for inhibiting tasks to be executed in response to a detection of a gesture when the detected gesture does not correspond to an extended finger.

13. The electronic device of any of aspects of 10 to 12 further comprising instructions for inhibiting tasks to be executed in response to the detection of a gesture when a recognized gesture movement does not correspond to a stored trajectory path.

14. The electronic device of any of aspects of 10 to 13 further comprising instructions for inhibiting tasks to be executed in response to the detection of a gesture that does not correspond to a quarter arm movement.

15. The electronic device of any of aspects of 10 to 14 where the non-transitory memory resides in a cloud storage.

16. The electronic device of any of aspects of 10 to 16 further comprising instructions for executing frame-to-frame comparisons to images that track the movement of the extended finger.

17. The electronic device of any of aspects of 10 to 17 further comprising instructions that detect the presence of the extended finger by executing a three-dimensional triangulation.

18. The electronic device of aspect 17 further comprising instructions that detect the presence of the extended finger by causing a rendering of a prediction of a bounding box through four coordinates.

19. The electronic device of any of aspects of 10 to 18 further comprising instructions that cause the transmitting of the message in response to a detection of an arm-gesture.

20. The electronic device of aspect 19 where the arm-gesture comprises a movement of an arm of the user to a first position.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A computer implemented method of controlling an electronic device in an absence of a physical contact and a radio frequency communication with the electronic device, comprising:
detecting a user's presence within a virtual detection range of at least one camera while the electronic device is in a standby state;
transitioning the electronic device to an interactive state when the user's presence is detected and activating at least one raw video stream from the at least one camera;
detecting presence of a user's appendage within the virtual detection range of the at least one camera and using the at least one camera to extract an image of the user's appendage from the at least one raw video stream;
comparing the image of the user's appendage to a plurality of images stored in a memory of the electronic device, wherein a comparison results in an identification of a specific appendage from the plurality of images;
maintaining the device in an interactive state when the specific appendage is identified;
rendering an aide output on a display of the electronic device as a result of the detecting of the specific appendage, wherein the aide output identifies the specific appendage and at least one visual cue for a predefined gesture of a plurality of predefined gestures associated with the specific appendage;
detecting movement of the specific appendage within the at least one raw video stream by the at least one camera;
in response to the movement of the specific appendage, predicting a bounding region defined by four coordinates, the bounding box used to extract a trajectory path of the movement of the specific appendage;
generating an object score of the trajectory path of the specific appendage within the bounding region;
in response to determining that the object score exceeds a predetermined threshold, execute a plurality of convolutional layers until a predetermined error is reached;

when the predetermined error is reached, identify a specific gesture of the plurality of predefined gestures associated with the trajectory path of the specific appendage;

rendering a message on the display of the electronic device as a result of the identification of the specific gesture; and executing functionality associated with the message in response to the specific gesture.

2. The computer implemented method of claim 1 further comprising displaying one or more visual cues while in the standby state, where the one or more visual cues comprise an image of the predefined gesture.

3. The computer implemented method of claim 2, where the one or more visual cues indicate a movement of the image along a trajectory within the virtual detection range that results in a gesture message association, a gesture-command association, a trajectory message association, and a trajectory-command associated and causes a transmitting of the message.

4. The computer implemented method of claim 1 where the predefined gesture stored in memory comprises a gesture-message association stored in the memory that causes the rendering of the message on the display.

5. The computer implemented method of claim 1 further comprising detecting a movement of a recognized predefined gesture and maintaining the device in the interactive state as a result of the detecting of the movement of the recognized predefined gesture.

6. The computer implemented method of claim 1 further comprising transmitting the message in response to a detecting of an arm-gesture.

7. The computer implemented method of claim 6 where the arm-gesture comprises moving a portion of a user's arm to a first position.

8. The computer implemented method of claim 7 where the moving the portion of the user's arm of the user to the first position causes transmitting a second message in response to detecting a predetermined angle formed by the portion of a user's arm movement to the first position and a virtual horizontal line.

9. The computer implemented method of claim 8, where the predetermined angle comprises a forty-five degree angle and where a moving of the portion of the user's arm to a second position causes transmitting a third message different from the second message in response to detecting the movement of the portion of the user's arm to the second position.

10. An electronic device comprising;
a display;
a processor in communication with the display; and
a computer program stored in a non-transitory memory executed by the processor that causes actions to be carried out through instructions for:
detecting a user's presence within a virtual detection range of at least one camera while the electronic device is in a standby state;
transitioning the electronic device to an interactive state when the user's presence is detected and activating at least one raw video stream from the at least one camera;
detecting presence of a user's appendage within the virtual detection range of the at least one camera and using the at least one camera to extract an image of the user's appendage from the at least one raw video stream;
comparing the image of the user's appendage to a plurality of images stored in the non-transitory memory of the electronic device, wherein a comparison results in an identification of a specific appendage from the plurality of images;
maintaining the device in an interactive state when the specific appendage is identified;
rendering an aide output on a display of the electronic device as a result of the detecting of the specific appendage, wherein the aide output identifies the specific appendage and at least one visual cue for a predefined gesture of a plurality of predefined gestures associated with the specific appendage;
detecting movement of the specific appendage within the at least one raw video stream by the at least one camera;
in response to the movement of the specific appendage, predicting a bounding region defined by four coordinates that is used to extract a trajectory path of the movement of the specific appendage;
generating an object score of the trajectory path of the specific appendage within the bounding region;
in response to determining that the object score exceeds a predetermined threshold, execute a plurality of convolutional layers until a predetermined error is reached;
when the predetermined error is reached, identify a specific gesture of the plurality of predefined gestures associated with the trajectory path of the specific appendage;
rendering a message on the display of the electronic device as a result of the identification of the specific gesture; and
executing functionality associated with the message in response to the specific gesture.

11. The electronic device of claim 10, where the rendering of the message occurs as a result of an extended finger moving along a predetermined trajectory.

12. The electronic device of claim 10, further comprising instructions for inhibiting a task to be executed in response to the detection of a second gesture when the trajectory path of the second gesture does not correspond to any of the plurality of predefined gestures.

13. The electronic device of claim 12, further comprising instructions that prevent tasks from being executed in response to the detection of the second gesture that does not correspond to a movement of a portion of a user's arm.

14. The electronic device of claim 10 where the non-transitory memory resides in a cloud storage.

15. The electronic device of claim 10, further comprising instructions that execute frame-to-frame comparisons to images that track the movement of an extended finger.

16. The electronic device of claim 10, further comprising instructions that detect the presence of an extended finger by causing a three-dimension triangulation.

17. The electronic device of claim 10, further comprising instructions that cause a transmitting of the message in response to a detecting of an arm-gesture.

18. The electronic device of claim 17 where the arm-gesture comprises a moving of an arm of the user to a first position.

* * * * *